(12) United States Patent
Brockmann et al.

(10) Patent No.: US 6,622,241 B1
(45) Date of Patent: *Sep. 16, 2003

(54) METHOD AND APPARATUS FOR REDUCING BRANCH PREDICTION TABLE POLLUTION

(75) Inventors: Russell C. Brockmann, Fort Collins, CO (US); Brian M. Kelly, Fort Collins, CO (US); Susith R. Fernando, Fort Collins, CO (US)

(73) Assignee: Hewlett-Packard Development Company, L.P., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/507,499

(22) Filed: Feb. 18, 2000

(51) Int. Cl.[7] .................................. G06F 9/32
(52) U.S. Cl. ...................................... 712/240
(58) Field of Search ................... 712/236–240

(56) References Cited

U.S. PATENT DOCUMENTS

| | | | | |
|---|---|---|---|---|
| 5,721,855 A | * | 2/1998 | Hinton et al. | 395/394 |
| 5,812,839 A | * | 9/1998 | Hoyts et al. | 395/586 |
| 5,826,074 A | * | 10/1998 | Blomgren | 712/238 |
| 5,859,999 A | | 1/1999 | Morris et al. | 712/224 |
| 5,860,017 A | | 1/1999 | Sharangpani et al. | 712/23 |
| 5,867,698 A | * | 2/1999 | Cumming et al. | 712/238 |

OTHER PUBLICATIONS

Wolfe, A., "Patents shed light on Merced's Innards", Electronic Engineering Times, Feb. 15, 1999.

* cited by examiner

*Primary Examiner*—Richard L. Ellis

(57) ABSTRACT

A branch target structure predicts a branch target address for an instruction flow. To conserve space, only a portion of the branch target address is stored. The branch target address is reconstructed assuming that an unspecified portion of a current branch instruction address matches corresponding bits of the branch target address. A comparator determines if the unspecified portion of the current branch instruction address matches corresponding bits of the branch target address. If the unspecified portion of the current branch instruction address does not match the corresponding bits of the branch target address, update of the branch target structure is inhibited. Otherwise update allowed.

10 Claims, 4 Drawing Sheets

METHOD AND APPARATUS FOR REDUCING BRANCH PREDICTION TABLE POLLUTION

TECHNICAL FIELD

The technical field is computer architectures that use branch prediction as a means to improve processing performance.

BACKGROUND

Modern microprocessors frequently use long pipelines to process instructions. A side effect of these long pipelines is an increase in the penalty for branches, which must redirect the instruction sequence. Usually, this branching behavior requires flushing at least a portion of the pipeline, thereby degrading pipeline performance. Branch prediction structures are commonly implemented in hardware to mitigate this penalty.

A branch prediction structure may predict branch targets and may store the branch target information in a branch prediction table. However, some branch target information that is stored in the branch target structure may be incorrect. These errors may occur because in some cases, only a portion of a target address is stored in the branch prediction table. In these cases, the remainder of the target address is inferred, typically using bits from the current branch instruction address. If this assumption is incorrect, entries in the branch prediction structure can be wasted and/or cause inefficient branch prediction. This incorrect information cannot be used for subsequent branch predictions and so is useless. The presence of this useless information is referred to as branch pollution.

SUMMARY

A comparator compares aliasing bits of a predicted branch target to corresponding bits of a current branch instruction address. The address comparison of the aliasing bits is made to determine if a branch target address is outside of a branch target range for a branch prediction structure. If the aliasing bits match, then assumptions about the branch target address being in a same memory block as the current branch instruction are correct, and the branch prediction is usable. If the aliasing bits do not match, then the branch prediction will be incorrect.

The results of the comparison are stored in a branch resolution table. The branch resolution table stores branches that are in the pipeline but that have not yet retired. When a branch instruction retires, a corresponding branch entry is accessed and a comparison result bit is examined. If the comparison result bit indicates that the branch target did not alias, the branch entry is allowed to update into the branch prediction structure so that future occurrences of the branch can be predicted. Otherwise, the branch entry will not be inserted. Avoiding insertion of the branch entry when the entry would have provided an incorrect branch target saves entry space in the branch prediction structure that can be used for more useful predictions, and potentially prevents additional incorrect predictions that may result from using an incorrect branch target.

In an alternative embodiment, the same comparison result bit flows down the pipeline with the rest of the instruction until retirement of the instruction. At retirement, if the comparison result bit indicates that the aliasing bits match, then the entry is allowed to be inserted into the branch prediction structure.

DESCRIPTION OF THE DRAWINGS

The detailed description refers to the following drawings in which like numerals refer to like items, and wherein.

DETAILED DESCRIPTION

Figure 1:
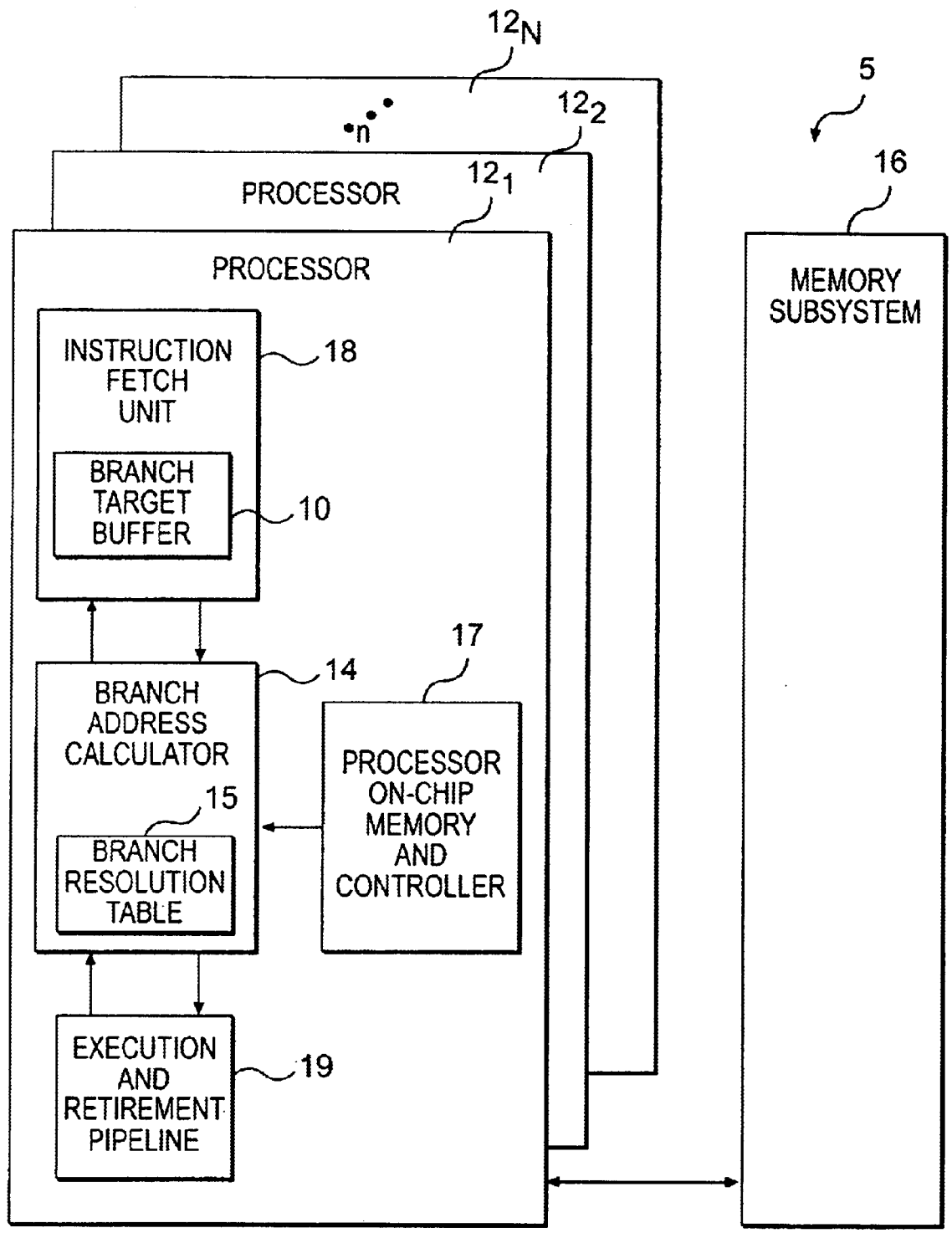
FIG. 1 is a block diagram of a computer system using a branch target buffer.

During instruction processing in modem computer systems, the processing may follow one or more branches that cannot be predicted with certainty in advance. An incorrect branch prediction may result in a significant processing penalty. In particular, with a deeply pipelined machine, a branch penalty, on the order of several cycles, may occur. Clock cycles are wasted if the computer system waits until the branch target is determined to start fetching instructions after the branch. To avoid this delay, a branch prediction structure predicts the target of a branch as an instruction fetch unit fetches an instruction. The prediction function is speculative and may be wrong. However, the processor is able to detect and recover when an incorrect prediction is made. Predictions made by the branch prediction structure of targets of direct branches may be verified downstream by a branch address calculator. If the branch prediction structure does not provide a prediction, the branch address calculator may calculate the targets and re-steer the fetch unit. Finally, once a branch is identified, the branch prediction structure may predict the target of that branch instruction.

In one implementation of such a branch prediction structure, branch targets for many branches are known early in the pipeline, but the branch targets are not entered into the branch prediction structure until retirement of the branch instruction. One of the data fields that may be included in such branch prediction structures is the branch target address. Due to space or timing constraints, the computer system, in particular the branch prediction structure, may only store a portion of the branch target address. The remaining data bits (referred to as aliasing bits) are implicit from the address of the branch itself. The tacit assumption is that the branch instruction targets another address within a same memory range as the current branch instruction. For instance, if the lower 20 bits out of 32 are stored for the branch target, then the predicted branch target is only valid if the branch target is in the same 1 MByte range (2 to the $20^{th}$ power) as the branch instruction itself. If any of the upper 12 bits do not match, then this assumption is incorrect. Allowing incorrect branch target predictions to enter the branch prediction structure wastes an entry because the entry is not likely to ever correctly predict the branch target. This condition is called pollution of the branch prediction structure.

Enhancements to the branch prediction structure help correctly predict a branch to be followed, thereby increasing the efficiency of the processing. In particular, a branch target buffer (BTB) can be used to provide dynamic branch prediction. That is, the BTB predicts branches early in a fetch pipeline to minimize the penalty that results from flushing and re-steering the target of the branch, once the branch target address is determined. In general, if an instruction address is not recorded in the BTB, instruction execution may be predicted to continue without branching. Any predicted taken branches may have a clock delay of one or, often, more, cycles. Finally, the BTB may store a history of branch predictions. Then, during the process of instruction fetch, the instruction address is checked with the entries in the BTB. If the address is not in the BTB, instruction execution is predicted to continue to the next instruction without branching behavior.

FIG. 1 shows a computer system 5 that incorporates branch prediction. The system 5 includes one or more processors $12_i$ and a memory subsystem 16. Each processor $12_i$ may also include an on-chip memory controller and/or cache memory 17, as is well known in the art. An instruction fetch unit (IFU) 18 in a processor 12 initiates an instruction fetch request for one or more instructions to the memory controller 17, which may also access the memory subsystem 16 according to principles well known in the art, and controls processing according to a specified pipeline design. A branch target buffer (BTB) 10 uses the instruction fetch address to predict whether the fetched instructions may contain a branch or not. If a branch is predicted to be taken, the IFU 18 will redirect program flow to the target of the branch. Information about taken branches, including the predicted sense of the branch (i.e., taken or not taken) and the predicted target of the branch, is sent down the pipeline to a branch address calculator (BAC) 14. The BAC 14 decodes the instruction returned from the memory controller 17, and calculates branch sense and/or target address information. The BAC 14 calculated information may be more accurate than the BTB 10 information, since actual instruction data is being used to perform the calculations. For example, branch targets that are encoded in the instruction, e.g., direct branches, can be accurately determined by the BAC 14. The BAC 14 will compare the calculated branch information against the prediction made by the BTB 10. If the BTB 10 failed to predict a branch, or if the BTB 10 predicted sense and/or target address is determined to be incorrect, the BAC 14 will cause the IFU 18 to redirect the program flow in accordance with the calculated BAC 14 information.

In an embodiment, the BAC 14 includes a Branch Resolution Table (BRT) 15. The BRT 15 is used to store information about the branch. This information is used during processing in the pipeline 19, through a retirement stage, at which time actual branch taken/not taken sense and branch target address is known for certainty. Note that the sense and/or branch target addresses for some branches may be known with certainty before retirement. For example, the branch target address for direct branches may be known with certainty by the BAC 14.

In another embodiment, the branch information can be pipelined along with the instruction to the execution and retirement pipeline 19.

Branch information stored in the BRT 15 and/or in the pipeline 19 is often used to update the BTB 10 with branch sense and target information. In an embodiment, this information may not be stored until the actual sense and/or target address is known, i.e., at retirement. As an example, retirement logic in the execution and retirement pipeline 19 can be sent to the BAC 14. This information, combined with information stored in the BRT 15, can be used to update the BTB 10.

A key distinction between the BTB predictions and the BAC predictions is that the BTB predictions are made solely on the basis of an instruction address, whereas the BAC 14 actually examines the instruction data and determines what the branch target is for direct branches where the target is encoded in the instruction itself.

FIG. 1 illustrates one possible arrangement of the computer system 5. As would be obvious to those skilled in the art, other component arrangements are possible that will allow reduction of branch prediction table pollution.

Figure 2:
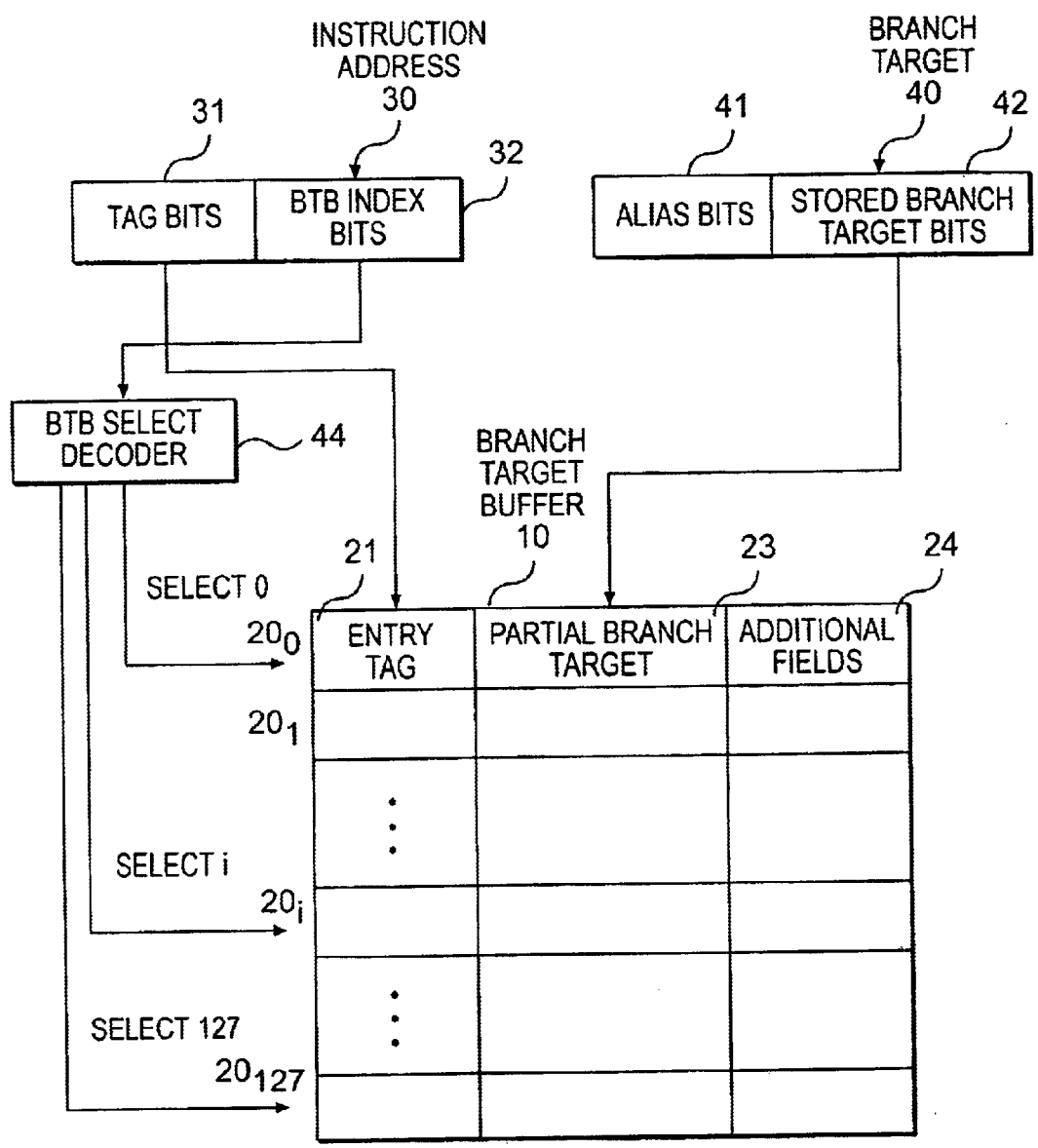
FIG. 2 illustrates a branch target buffer.

FIG. 2 shows an example of a BTB, such as the BTB 10, that may be used for dynamic branch prediction. In a computer system with multiple processors, each such processor, such as the processor 12, may include a BTB 10. During instruction fetch by an IFU 18, an instruction address 30 is generated. A portion of the bits, such as BTB index bits 32, are used to index into the BTB 10 using a decoder 44. For the example shown, the BTB has 128 entries, so that 7 index bits 32 are required to uniquely index each entry in the BTB 10. Once an entry is selected, tag bits 31 are compared to entry tag 21 to determine whether an entry selected by the index bits 32 in the BTB 10 pertain to a current branch instruction address 30. As is common in the art, only a portion of the tag bits 31 may be stored in the entry tag 21 of an entry 20.

Additional fields 24 are provided in each BTB entry which are well known in the art. For instance, additional fields may include branch prediction taken/not taken history or branch type.

A branch target field 23 in the BTB 10 indicates that only a portion of a branch target 40 is stored in the BTB. One or more alias bits 41 are not stored in the BTB 10; the remaining bits will be implied from the current branch instruction address 30 when the BTB entry $20_i$ is used to predict a branch. Only storing a partial branch target, often chosen due to space or timing constraints, results in the potential to incorrectly predict a branch if the alias bits do not, in fact, match the address of the branch instruction itself 31.

Figure 3:
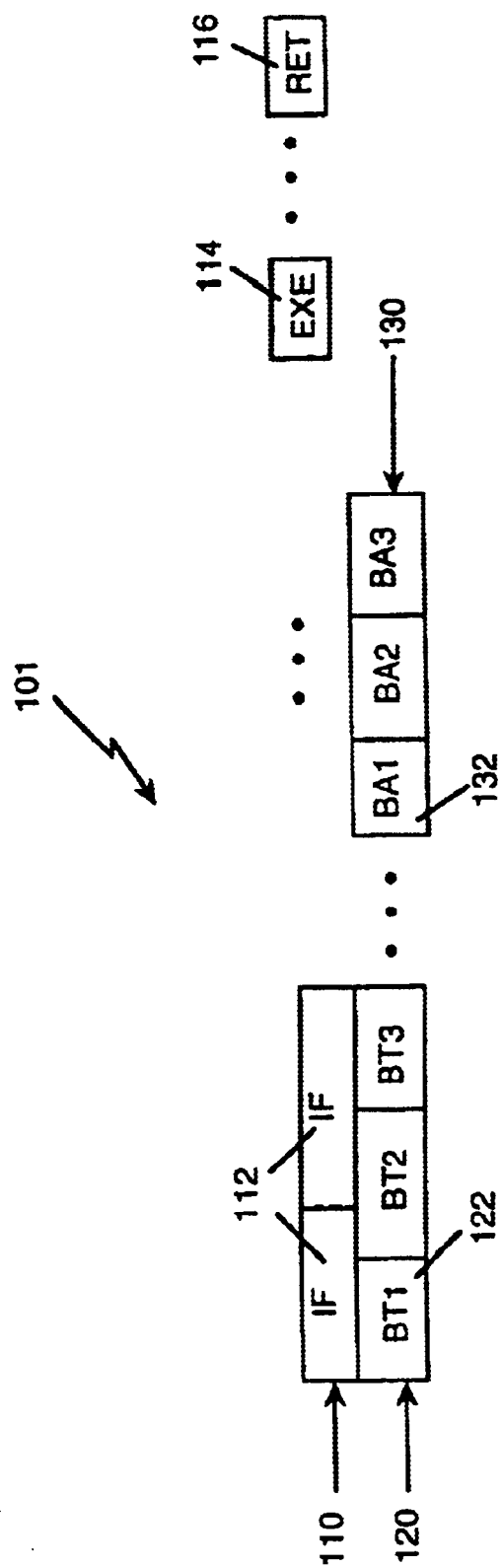
FIG. 3 illustrates a processing pipeline used in conjunction with the branch target buffer of FIG. 2.

FIG. 3 illustrates a simplified processing pipeline 101 that may be used in conjunction with the BTB 10. The pipeline 101 includes a main processing pipeline 110, a branch target pipeline 120 and a branch address pipeline 130. Processing in the pipelines 110, 120 and 130 may occur in parallel. The main pipeline 110 may include one or more instruction fetch stages 112, an instruction execute stage 114, and a retirement stage 116. As indicated in FIG. 3, numerous other stages may be included in the main stage 110. The branch target pipeline 120 may include one or more branch target stages 122 in which the BTB 10 predicts a branch taken or not taken. Finally, the branch address pipeline 130 includes one or more branch address stages 132, in which the BAC 14.

As noted above, an instruction address as stored in the memory 16 may comprise 32 bits. However, instead of storing all 32 bits of an instruction address for a target branch, the BTB 10 may implement only a subset of the address bits, under the assumption that a target branch address is likely to be close to a current instruction address. In an embodiment, only 20 bits of the branch target address are stored in the branch target field 23 of the BTB 10. The remaining 12 bits of the branch target address 41 are implied based on the address of the current instruction. Thus, when a predicted branch is taken, the upper 12 bits of the current instruction address are prepended (i.e., added to the front of) to the lower 20 bits of the branch target address, with the lower 20 bits of the branch target address stored in the branch target field 23 of the BTB 10. In an embodiment, the branch target address is then assumed to be within a 1 Mbyte memory block, or branch target range.

A normal sequence may start with the BTB 10 empty of any entries. The IFU 18 reads through the BTB 10, but because the BTB 10 contains no entries, the processing continues to the branch address calculator (BAC) stage of the pipeline. The BAC 14 determines if an address of the branch target is more than 1 Mbyte away from the current branch instruction address. This determination is made by comparing the upper bits of the BAC 14 calculated address to the corresponding upper bits of the current branch instruction. Since the BTB 10 had no entry for the branch, and was therefore unable to predict the branch at all, the BAC 14 will need to re-steer instruction fetch to the target of the branch. After the retirement stage 116, the branch target address is written to the BTB 10. However, the address written to the BTB 10 is truncated to 20 bits. This may cause unnecessary flushing and re-steering, unless a mechanism is provided to detect this error. In particular, the BTB 10 and BAC 14 will again encounter the branch target instruction. However, this time the instruction address has an entry in the BTB 10. The BTB 10 will construct the predicted branch target by concatenating the partial target address bits stored in the BTB 10 and the implied (or aliasing) bits from the current fetch address. That is, the remaining 12 bits of the current branch instruction address are prepended (i.e., added to the front of) to the lower 20 bits of the branch target address. The processor will then re-steer to that target address, which is within 1 MByte of the current branch instruction address, but which is incorrect. The BAC 14 will note the incorrect address and flush the pipeline, invalidate the BTB entry, and re-steer again. Then, processing of the instruction will continue through the pipeline 110. When the instruction processing reaches the retirement stage 116, the branch target instruction address will be allocated back into the BTB 10. The next instance of this instruction will therefore also result in a flush and re-steer.

To avoid this problem, the BAC 14 compares the upper unimplemented bits of the target address (e.g., the upper 12 bits or aliasing bits) with corresponding bits in the current branch instruction address. If the aliasing bits match the corresponding bits in the address of the branch instruction, then the assumptions about the branch target address being in the same memory block as the address of the current branch instruction are correct, and the prediction is usable. If the result of the comparison is no match, the branch target prediction is incorrect.

The result of comparing the aliasing bits is stored in the BRT 15 (see FIG. 1). Each result or entry includes a comparison bit that indicates if the aliasing bits in the predicted target and the address of the branch instruction match. The BRT 15 stores branches that are in the pipeline 19, but that have not been retired. When the branch retires, the corresponding branch entry is accessed and the comparison bit is examined. If the comparison bit indicates that the branch target address did not alias, the BTB 10 is updated with the branch information. If the comparison bit indicates no match, the BTB 10 is not updated with the branch information. This prevents the recording of a branch target address that will cause an extra flush and re-steer. Subsequent comparison of the branch target address will also result in assertion of a bit assertion of a bit to suppress update of an entry in the BTB 10 for the particular instruction address. Thus, at most one re-steer will be required for a mis-predicted branch target address.

In an embodiment, the comparison bit may be set to 1 if the comparison indicates no match. Other encoding mechanisms may be used to suppress updating of the BTB 10.

As an alternative to setting the comparison bit upon completion of the comparison by the BAC 14, a comparison bit may be set with the instruction. In this alternative, the comparison bit will flow down the pipeline with the rest of the instruction until the instruction retires. At retirement, if the comparison bit indicates that the aliasing bits match, then the entry is allowed to be inserted into the BTB 10.

As another alternative, the BTB 10 may be updated before retirement. As in other alternatives described above, the result of the aliasing bit comparison is used to determine whether an entry should be allocated to the BTB 10.

Figure 4:
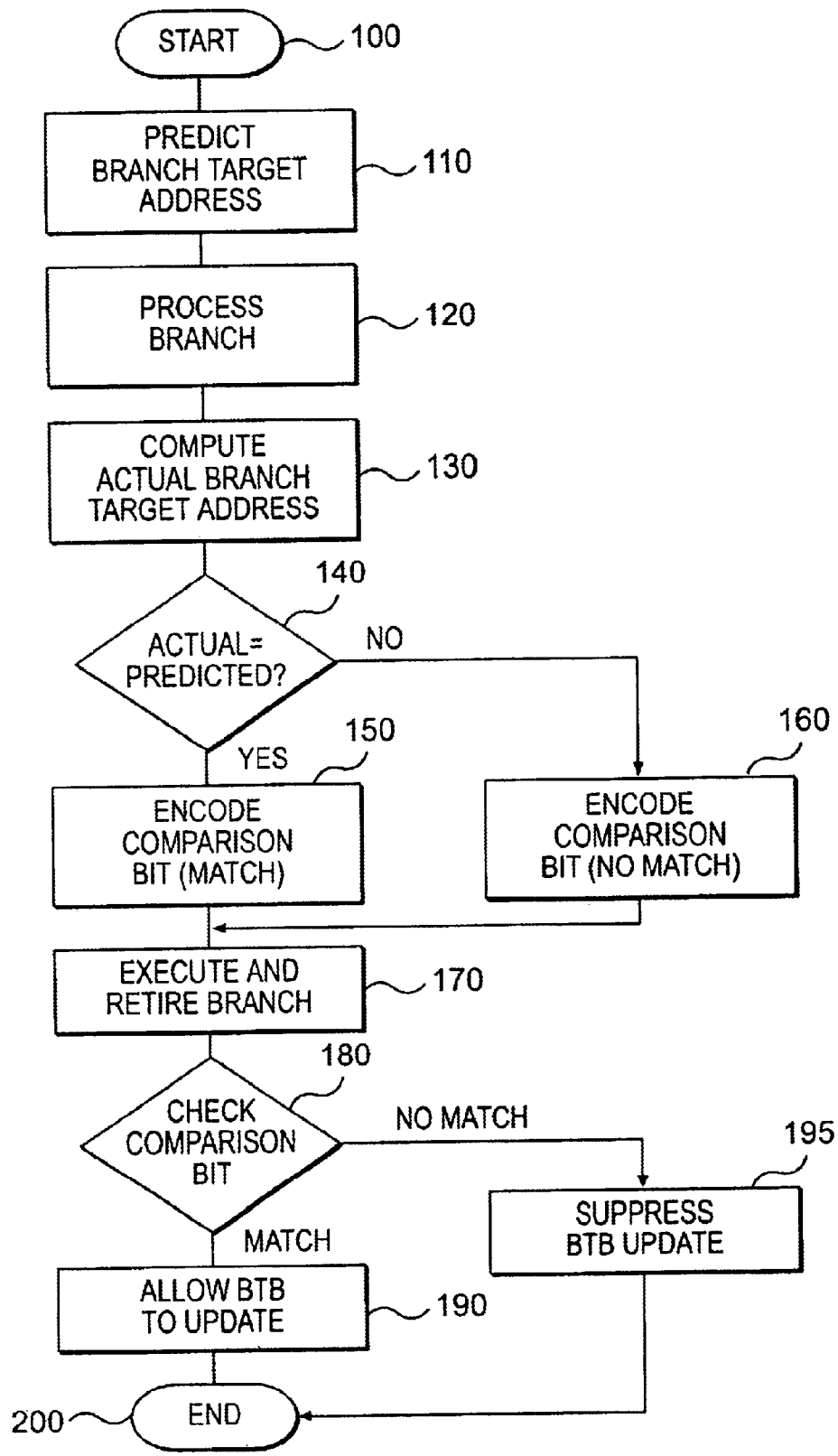
FIG. 4 is a flowchart illustrating processes executed in conjunction with the branch target buffer of FIG. 1.

FIG. 4 illustrates a process used to reduce branch prediction table pollution. The process starts at 100. The BTB 10 predicts a current branch instruction address, Block 110. The instruction is fetched, further processed and sent to the BAC 14, Block 120. The BAC 14 then computes the branch target address 130 and compares the aliasing bits of the computed and predicted branch target address, Block 140. The results of the aliasing bit comparison are encoded and stored, e.g., in the pipeline 19 or in the BRT 15, Blocks 150, 160. After execution and retirement (Block 170), the stored comparison bit is examined, Block 180. If the encoding of the comparison bit indicates that the aliasing bits matched, the BTB 10 is updated with the branch information, Block 190. If the encoding of the comparison bit indicates that the aliasing bits do not match, the BTB update is suppressed, Block 195. In Block 200, the process ends.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for reducing branch prediction table pollution in a computer system comprising instructions having possible branches, the method comprising:
   predicting a branch target address for a branch using a branch prediction structure, processing the branch;
   computing an actual branch target address;
   comparing bits of the predicted branch target address and bits of the actual branch target address that are not stored in the branch prediction structure;
   setting a comparison bit with an instruction, wherein the comparison bit flows with the instruction; and
   if the comparison indicates a match, storing a portion of the actual branch address in the branch prediction structure.

2. The method of claim 1, wherein the comparison result is indicated by setting a comparison bit.

3. The method of claim 2, wherein the comparison bit is set in a branch resolution table.

4. The method of claim 1, wherein the predicted branch target address is based on a first portion of an address and a second portion of the address, the method further comprising deriving the second portion of the address based on an address of a current branch instruction.

5. The method of claim 4, wherein the current branch address and the predicted branch target address are assumed to occupy a same memory region.

6. The method of claim 1, wherein the comparison is completed before branch retirement.

7. The method of claim 1, wherein the comparison is completed after branch retirement.

8. An apparatus for reducing branch prediction table pollution in a computer system comprising instructions having possible branches, the apparatus comprising:

a branch target buffer (BTB) that predicts a branch target; and a branch address comparator (BAC) coupled to the BTB that calculates the branch target and sets a comparison bit, wherein the calculation comprises comparing unimplemented bits of a branch target address with corresponding bits in an actual branch target address for a match, wherein the comparison bit is set with an instruction and flows with the instruction, and wherein when a match occurs, the BAC allocates a portion of the branch target address to be written into the BTB.

9. The apparatus of claim 8, wherein the BAC comprises a branch resolution table, the branch resolution table comprising:

branch target address information; and a comparison bit that indicates a comparison result.

10. The apparatus of claim 8, wherein a matching comparison indicates that the implemented bits of the branch target address are in a same memory block as the corresponding bits of the current instruction.

* * * * *